3,198,656
COLOR COATED CELLULAR INORGANIC
AGGREGATE
Richard B. Harlan, San Clemente, Calif., assignor to
Colorlite Company, a partnership of California
No Drawing. Filed Nov. 19, 1962, Ser. No. 238,796
1 Claim. (Cl. 117—100)

This invention pertains to color coated, bloated aggregate.

The term "bloated" aggregate is now commonly employed to designate a type of light weight cellular product produced from various clays and related compositions having "bloating" characteristics. In the manufacture of this type of product the raw material used is formed into relatively small pellets or balls, and these pellets or balls are heated under controlled conditions so as to cause a vitrication of their outer surfaces and the liberation of volatile materials after surface vibration takes place while the internal structure of the pellets is flexible. These conditions result in internal expansion or "bloating" of the pellets. The bloated product resulting from this heating can be used as aggregate in concrete when cooled. This type of process is described in the Bureau of Mines Report of Investigations R.I. 4401 dated November, 1948, as well as in a great deal of other literature.

Although there are a great many theories as to what causes the bloating process in various clays and shales, the mechanism of this process is at this time essentially unknown. Very little is also known about the physical and chemical structure of the internal and surface cell walls within bloated aggregate. It is believed that these cell walls have substantially the same chemical composition as the raw material from which they are created, but that they differ from such raw materials as to the manner in which the various oxides within them are oriented with respect to one another. It is also believed that such cell walls differ from conventional ceramic articles produced from the same raw materials in the same manner and that the surfaces of such bloated particles are of a semi or partially vitrified character.

Because of these factors, a bloated aggregate cannot be considered in the same category as a conventional clay-type ceramic. Hence, the various techniques and the like which are normally expected to apply to the treatment or processing of clay-type ceramics cannot be expected to be operative with bloated aggregate. This is particularly the case when such aggregate as produced has a relatively smooth, glazed type of surface coating which makes it impenetrable by significant amounts of water. It is, however, true with a porous type of bloated aggregate capable of absorbing sufficient moisture so as to have a density greater than that of water.

The present invention can be summarized as being based upon the discovery that conventional bloated aggregate can be processed so as to have a color coating virtually any color or shade or hue, enabling this aggregate to be employed for other purposes than those purposes for which it has been previously used. The present invention is also based upon the discovery that certain essentially conventional techniques in the field of ceramic glazing can be modified slightly so as to be used as hereinafter explained in order to produce a substantially uniformly coated type of aggregate particle.

Depending upon variations in these techniques so as to use inorganic oxides of different colors, color coated aggregates of a bloated type can be produced in accordance with this invention.

These aggregates are intended to be used in various fields where colored rock or aggregate is desired for asthetic or similar reasons. At the present time, certain types of roofs are covered with colored rocks. These rocks are relatively heavy. Because of this, they are relatively expensive to ship. They are also undesirable since they increase the weight load upon a roof to an undesired extent, necessitating "heavier" or better designed roofs than are desired for economic reasons. Similarly colored rocks are used for decorative effects in aquariums, mosaics and the like. In all of these cases the weight of these rocks is economically detrimental to their use.

A coated, bloated aggregate of the present invention is produced starting with conventional bloated aggregate particles as the raw material. Such particles are considered to consist primarily of complex aluminum silicates containing minor amounts of other oxides such as iron or titanium in chemical combination with these aluminum silicates. These particles normally have a vitrification temperature of between 1800° F and 2000° F. Although the color of these bloated aggregates may vary somewhat depending upon the amount and type of minor quantities of impurities within them in general they may all be referred to as having an "earthy" or "clayish" type of appearance.

It is preferred to utilize with the present invention particles of bloated aggregate which as produced have a relatively smooth glazed type of surface coating or appearance so as to avoid any tendency for internal coloring within the aggregate particles. The process of creating colored, coated aggregate herein explained can, however, be used with what is commonly referred to as porous bloated aggregate. This latter type of aggregate tends to have an irregular angular surface appearance.

The size of the particles of bloated aggregate which are used with the present invention may be varied over substantially very wide limits. In general, the size of these particles is determined by the ultimate use to which they will be placed. Thus, for example, colored aggregate of this invention which will be used for roofing purposes should be sufficiently large so as to effectively preclude wind blowing it from its ultimate location, while coated aggregate particles of this invention designed for decorative effects in patios and the like may be sufficiently small to provide a surface covering of a relatively smooth category. In all cases, however, such aggregate particles should be sufficiently large so that they can be easily discerned by the eye.

In accordance with this invention, the bloated aggregate particles used as a raw material are coated with a ceramic type of overglaze composition containing various fluxes, binders and coloring agent or agents dispersed within an appropriate liquid vehicle of which water is the most conveniently used. This glazing composition is preferably proportioned in accordance with known practice so as to have a softening point or point at which it, after removal of the vehicle, will become tacky and tend to flow below the temperature at which the bloated aggregate will tend to be affected by heat. In general, the lower the temperature at which at the glaze composition will tend to become soft and tacky the better, since there is less danger of the bloated aggregate used with it being subjected to thermal shock during processing. Such shock will tend to break up the particles of this aggregate. Presently prefered results have been achieved using glaze compositions which adhere to ceramic bodies at a temperature corresponding to the softening point of Seger Cone 017. Such a cone will deform at about 1328° F. if heated at the rate of 68° F. per hour at about 1418° F. if heated at the rate of 302° F. per hour.

A glaze composition to be useable with this invention should, of course, be finely ground so that the various oxides within it are uniformly dispersed. Preferably all particles of such a composition should at least pass a standard Tyler 200 mesh screen, and preferably should pass a 325 mesh screen of this type. In general, such a composition should have a viscosity roughly corresponding to the viscosity of conventional paint so that it can be easily handled and applied to the surface of coated aggregate particles.

Such application may be accomplished in a number of different ways. The glaze composition may be poured over the aggregate particles as these particles are being stirred, and the stirring can be continued until such time as all of the particles are coated to a substantially uniform extent. It is also possible to accomplish such coating by placing a quantity of the glaze composition with a quantity of aggregate particles in a shaker or similar vibrating device which will cause the particles of aggregate to roll and otherwise move in contact with one another in the glaze until these particles are uniformly coated with the glaze composition. Such coating can also be accomplished by tumbling the aggregate particles in an appropriate tumbling drum together with a quantity of the glaze.

All of these methods provide substantially uniformly coated aggregate particles. The amount of glaze composition used in producing this intermediate product should be just sufficient to substantially cover all of the surfaces of the aggregate particles being coated. If a deficiency in the amount of glaze composition is present, the final coated, bloated aggregate particles produced in accordance with this invention will not have a desired uniform color. An excess of glaze composition of a quantity sufficient to create processing difficulties will not adhere to the particles of aggregate under normal conditions.

One of the surprising aspects of the present invention lies in the fact that bloated aggregate particles coated as described in the preceding can be satisfactorily handled to a nominal extent after they are coated without the coating rubbing off, and that they can be heated so as to cause the glaze composition used to form a firm, adherent coating without the individual particles sticking to one another to any significant extent. Thus, in practicing the present invention, so-called "blotches" or "pull-outs" encountered in conventional ceramic practice where an object is in contact with a surface being glazed are not of importance since to all practical extents they are not encountered.

In accordance with this invention, the bloated aggregate particles coated with a glaze composition or binder are heated to a temperaure sufficient to volatilize the vehicle used in the glaze composition and to cause the oxides within this composition to soften to a point where fusion tends to occur. In effect, such fusion bonds the individual particles of the glaze to one another and to what is considered to be the very peculiar complex inorganic structure of the surface of the aggregate. This heating preferably is carried out at a temperature below 1800° F.; the lowest point at which any change or alteration of the surface of a bloated aggregate particle can be expected to take place. This results in the final product which may be air cooled.

The reactions during this heating are of a time-temperature character. In general, temperatures between the temperature at which the glaze mixture tends to soften and temperatures at which any change in the aggregate per se are encountered can be used. As indicated in the preceding, presently prefered results are achieved within the range of temperature range of 1328° F. to 1418° F. at which the Seger Pyrometric Cone 017 tends to soften. If lower temperatures of from 1238° F. to 1328° F. within the softening range of Seger Cone 018 are used the glaze composition tends to powder on the particles employed. Temperatures in excess of 1418° F. tend to cause the glaze composition on the particle to stick, holding the particles together to a slight extent, and, hence, should be avoided in creating coated, bloated aggregate particles in accordance with this invention.

The heating step employed in order to create the final product of this invention can be carried out with the intermediate coated aggregate particles resting upon a suitable support, or in rotary kilns or with various other similar pieces of equipment. Although it is not considered absolutely necessary it is considered preferable that such equipment be constructed so as to provide for relatively slow cooling of the final coated aggregate particles in order to minimize any possible or potential problem of thermal shock cracking the aggregate.

Coated, bloated aggregate formed as indicated in the preceding discussion may be shipped without any danger of physical damage so long as normal handling procedures are observed. This aggregate can also be used in a variety of different ways for decorative or other purposes. It will be realized from the foregoing that it may be manufactured at a comparatively nominal cost.

As an aid to understanding the following specific examples are given of the procedure in forming colored, bloated aggregate of the present invention. It is to be understood that these examples are given for explanatory purposes only, and are not to be considered as limiting this invention in any respect.

*Example 1*

Bloated aggregate particles ranging from about one inch to about two inches in diameter and having a vitrified surface appearance and the following chemical composition expressed as percent by weight: $SiO_2$ 54%; $Al_2O_3$ 16%; $Fe_2O_3$ 6.5%; CaO 4%; MgO 3%; $Na_2O$ and $K_2O$ 3%; and $TiO_2$ 1% were coated in a tumbling drum with an overglaze composition having the following ingredients: 60 grams frit No. 33 (having the following composition by weight 6.46% $Na_2O$; 59.17% PbO; 14.53% $B_2O_3$ and 19.84% $SiO_2$), 30 grams Kentucky No. 4 clay (containing 51.65% $SiO_2$ by weight), and 2½ grams of $CoCO_3$ and sufficient water so that the glaze composition had substantially the viscosity of a conventional paint. The particles in the glaze were sufficiently small so as to all pass a standard 325 mesh Tyler screen. After the aggregate particles were completely coated, they were then placed against one another upon an inert support and heated in a tunnel kiln at the rate of about 302° F. per hour until a temperature of about 1418° F. was achieved. The particles were then removed from the kiln and allowed to cool in air. The particles obtained in this manner were coated a uniform light blue color. They did not stick to one another as a result of contact with one another during the heating step, and in each case the color on the surface appeared to be fused in place and was uniform.

*Example 2*

The procedure set forth in the preceding example was used in creating dark blue particles by varying the preceding example so as to use 6 grams by weight of $CoCO_3$ instead of 2½ grams $CoCO_3$. In this case the aggregate particles produced were coated a dark blue.

*Example 3*

Green coated aggregate particles were produced using the procedure set forth in Example 1 by varying the glaze composition so as to use 5 grams of $Cr_2O_3$ instead of the $CoCO_3$ specified.

*Example 4*

Bloated aggregate particles ranging from about one mesh standard Tyler screen size up to about 50 mesh standard Tyler screen size in dimension having a vitrified surface appearance and having the same chemical composition as the aggregate particles specified in Example 1 were coated by being placed on a vibrating tray with an overglaze composition having the following ingredients: 60 grams frit No. 33 (as specified in Example 1); 15 grams Kentucky No. 4 clay (containing 51.6% $SiO_2$ by weight) 10 grams of a chrome tin red ceramic color as specified in the test "Parmelle, Ceramic Glazes," Industrial Publications, Incorporated, Chicago 3, Illinois (1948), and sufficient water so that the glaze coating had substantially the viscosity of a conventional wall paint. After the aggregate particles were completely coated they were placed against one another in a pile upon an inert support and heated in a tunnel kiln at the rate of 68° F. per hour until the temperature of the particles was approximately 1328° F. The particles were then removed from the kiln and cooled in air. The particles obtained in this manner were coated a uniform red color. They did not stick to one another as a result of contact with one another during the heating step and in each case the color on the surface of the particles was uniform and appeared to be fused in place.

*Example 5*

Black coated aggregate particles were produced using the procedure set forth in Example 4 by varying the glaze composition so as to omit the chrome tin red color and so as to substitute for it the same weight of a black inorganic mixture having the following composition: cobalt oxide 19.0% by weight; chrome oxide 18.0%; ferric oxide 36.5%; manganese dioxide 20.5%; nickelous oxide 12.8%, this color having been created by calcining this mixture at a temperature 800 to 900° C. and then grinding it.

*Example 6*

Bloated aggregate particles ranging in size from about ¼ inch in diameter to about ¾ inch in diameter having a glaze surface appearance and a composition as specified in Example 1 were coated in a tunnel drum with an overglaze composition having the following ingredients: 60 grams frit No. 33 (as specified in Example 1), 50 grams Kentucky No. 4 clay (containing 51.65% $SiO_2$ by weight) and 20 grams by weight of a yellow inorganic color prepared by mixing 132.4 parts by weight lead nitrate, 123.6 parts by weight calcium stannite, 10.2 parts by weight aluminum, 57.6 parts by weight antimony oxide, 162.1 parts by weight sodium chloride and calcining this mixture under oxidizing conditions at about 800 to 900° C., grinding and then washing with water the resultant product, and sufficient water so that the glaze composition had substantially the viscosity of paint. After the aggregate particles were completely coated they were then placed upon an inert support against one another and heated in a tunnel kiln at the rate of about 302° F. per hour until a temperature of about 1418° F. was achieved. The particles were then removed from the kiln and allowed to cool to room temperature in air. The particles resulting from this series of operations were coated a uniform yellow color. They did not stick to one another as a result of contact with one another during the heating step, and in each case the color on the surfaces of the particles appeared to be fused in place.

I claim:

A particle of bloated, cellular inorganic aggregate having a vitrified, glazed surface appearance, said particle being substantially impenetrable to water, said particle being covered with an adherent inorganic ceramic overglaze coating which is fused to said surface, said coating having a color different from the color of said aggregate.

References Cited by the Examiner

UNITED STATES PATENTS

| | | | |
|---|---|---|---|
| 1,766,815 | 6/30 | Fisher | 117—100 |
| 1,943,858 | 1/34 | Dwight | 117—100 |
| 1,970,471 | 8/34 | Nichols | 117—100 X |
| 2,001,448 | 5/35 | Beasley | 117—100 X |
| 2,004,682 | 6/35 | Wright | 117—100 |
| 2,010,620 | 8/35 | Wright | 117—100 |
| 2,054,317 | 9/36 | Gundlach | 117—100 |
| 2,202,002 | 5/40 | Harshberger | 117—100 |
| 2,259,879 | 10/41 | Benning | 117—100 |
| 2,331,868 | 10/43 | Swenson | 117—100 X |
| 2,439,650 | 4/48 | Cuno | 117—100 |
| 2,478,757 | 8/49 | Foster | 117—100 X |
| 2,493,198 | 1/50 | Kelly | 117—100 |
| 2,987,411 | 6/61 | Minnick | 106—122 X |

WILLIAM D. MARTIN, *Primary Examiner.*